United States Patent [19]

Genge et al.

[11] Patent Number: 5,541,952
[45] Date of Patent: Jul. 30, 1996

[54] APPARATUS AND METHOD OF PREHEATING STEEL SCRAP FOR A TWIN SHELL ELECTRIC ARC FURNACE

[75] Inventors: Ulrich F. H. Genge, Pittsburgh; Raymond J. Burda, Cheswick; John W. Brandon, Pine Township, all of Pa.

[73] Assignee: Mannesmann Demag Corporation, Coraopolis, Pa.

[21] Appl. No.: 263,922

[22] Filed: Jun. 21, 1994

[51] Int. Cl.⁶ .................................................. F27D 23/00
[52] U.S. Cl. ................................ 373/9; 373/80; 75/10.38
[58] Field of Search .................................. 373/2, 8, 9, 78, 373/80; 75/10.38, 581; 266/140

[56] References Cited

U.S. PATENT DOCUMENTS

| | | | |
|---|---|---|---|
| 3,612,739 | 10/1971 | Korneff | 373/78 |
| 3,880,648 | 4/1975 | Forrest | 75/10.38 |
| 4,531,971 | 7/1985 | Sugiura et al. | 75/10.38 |
| 4,706,258 | 11/1987 | Sugiura et al. | 373/2 |
| 5,264,020 | 11/1993 | Ehle et al. | 75/10.38 |

Primary Examiner—Tu Hoang
Attorney, Agent, or Firm—Webb Ziesenheim Bruening Logsdon Orkin & Hanson, P.C.

[57] ABSTRACT

Apparatus and methods of abating the objectionable emissions of volatile hydrocarbons generated during the preheating cycle of a twin vessel electric arc furnace steelmaking operation wherein the vessels cycle between a powered or melting state and an unpowered state. During the unpowered state, scrap charged to the non-powered vessel is preheated. The spent off-gases from the non-powered vessel may contain toxic and/or noxious hydrocarbons therein by virtue of certain plastics and/or grease/oils mixed with the scrap being preheated. The spent off-gas from the preheat vessel is delivered to a combustion chamber to be mixed with a hot off-gas diverted from the powered vessel. The temperature of the mixed off-gases in the combustion chamber is raised to a critical temperature to burn/crack the objectionable hydrocarbons, which may include dioxins and furans. The temperature of the spent off-gas can be increased more rapidly during initial melting stages by employing burners in the preheat vessel and/or by decreasing the size of the scrap charge and increasing the molten heel left in the non-powered vessel after tapping.

27 Claims, 3 Drawing Sheets

APPARATUS AND METHOD OF PREHEATING STEEL SCRAP FOR A TWIN SHELL ELECTRIC ARC FURNACE

BACKGROUND OF THE INVENTION

1. Field of the Invention

The present invention relates generally to steelmaking and, more particularly, to steelmaking operations carried out in a twin shell electric arc furnace (EAF). The present invention is particularly suited for use in connection with the EAF steelmaking process, wherein the remelting of scrap is one of the primary sources of raw material.

2. Description of the Prior Art

The EAF steelmaking process has in recent times captured an increasingly larger percentage of the world's steelmaking capacity due to its constantly improving operating efficiencies and production capabilities. Currently, a single EAF operating unit is capable of producing 1,500,000 tons of steel per year. To obtain this annual tonnage, a two vessel or so-called twin shell furnace was developed to maximize utilization of the installed electrical equipment and to minimize fluctuating loads on the utility supply. In the twin shell concept, one furnace shell is powered and in the melting mode while the second furnace shell is non-powered and in one of the tap, charge or fettle (repair) modes. The tap, charge and fettle modes require less time than the melting mode. This non-powered time increment can also be used to preheat a charge of scrap in the non-powered shell. After the scrap is preheated, the non-powered shell is powered to melt the scrap.

Scrap preheating currently takes two forms. One form uses interconnecting ductwork between the two shells with the hot exhaust gases from the powered vessel being drawn through the non-powered unit. This form of preheating is disclosed in co-pending U.S. patent application Ser. No. 08/212,581, filed Mar. 11, 1994, in the name of Raymona J. Burda and assigned to the assignee of the instant application. The other common form of scrap preheating in twin shell EAF processes utilizes a plurality of oxygen-fuel or oxygen/air fuel burners in the shell walls to preheat the charged scrap while the fume or off-gas from each vessel is exhausted separately.

Both of these known preheat practices are effective in improving net unit electrical efficiency and production capacity, but both produce undesirable organic compounds in the spent off-gas exhausted during the scrap preheating cycle. The spent off-gas from the preheating cycle is high enough in temperature to volitize the organic compounds commingled with the scrap. Oftentimes a noxious odor is also produced in the off-gas.

Emissions from an EAF steelmaking process basically occur In the form of dust and gas. Reducing dust emissions to the required environmental levels is, of course, well known in the art, such as by using fabric filters in a conventional bag house, for example. With regard to gaseous emissions, dioxins are currently of critical concern, particularly when heating steel scrap having plastic material such as polyvinyl chloride mixed therewith. It is oftentimes very difficult or impossible to segregate the metal and plastic materials, such as in the case of compacted scrap automobiles for example. Some plastic components will be intimately combined with the steel in the compacted process shape even though magnetic separation is attempted. The term dioxin is used to describe many different organic compounds belonging to the family of polychlorinated dibenzodioxins (PCDD's). Also of concern, from a toxic gaseous emissions standpoint, are furans which belong to the family of polychlorinated dibenzofurans (PCDF's).

In addition, some scrap, such as steel turnings, for example, may contain oil, grease and/or other organic residues, which, upon heating, also cause the emission of volatile organic compounds. While these volatiles are not potentially toxic like the aforementioned dioxins and furans, they may, however, create objectionable odors which are unacceptable in the environment, especially in the vicinity of residential areas.

It is known that PCDD's and PCDF's may be cracked/burned at temperatures above about 1200° C. forming $CO/CO_2$ and $H_2O$ as the reaction products. These thermally treated off-gases must then be rapidly cooled in order to avoid a reverse reaction and reformation of PCDD's and PCDF's. It is also known that the non-toxic, noxious smelling, organic compounds resulting from the volatization of oils and greases undergo a comparable decomposition at temperatures on the order of 750°–800° C. which eliminates odor problems.

Heretofore, a commonly employed way of eliminating objectionable organic volatile emissions has involved the use of afterburners to raise the temperature of the off-gases above the critical temperature range. These afterburners combust or crack the organic volatile in an environmentally acceptable manner, but are extremely uneconomical from an energy cost standpoint. The afterburners oftentimes consume as much energy as is saved by the preheating operation, thus, minimizing or offsetting any benefit in energy efficiency resulting from the scrap preheating step.

The present invention solves these aforementioned problems by providing an apparatus and methods for use in a twin shell EAF steelmaking operation which eliminate the emissions of objectionable toxic furans and dioxins, and also noxious smelling, organic compounds as well as carbon monoxide which may be generated during scrap preheating and melting operations. The present invention achieves these desirable environmental objectives in an energy efficient manner.

SUMMARY OF THE INVENTION

Briefly stated, the present invention includes a first duct interconnecting two vessels in a twin shell electric arc furnace installation. The first duct permits the passage of hot off-gases from the powered vessel to preheat scrap charged in the non-powered vessel. Alternatively, the scrap may be preheated in the non-powered vessel by utilizing a plurality of oxy-fuel fired burners exclusively. A second duct extends from the non-powered vessel and communicates with a combustion chamber positioned between the vessels. The second duct directs the cooler, spent off-gases from the non-powered, preheating vessel to the combustion chamber. The spent off-gases exiting from the non-powered vessel have at this point passed through the scrap material giving up its sensible heat thereto and, as a result, may contain toxic or noxious, organic volatiles if plastics and/or oil/grease are present in the scrap charge. A third duct diverts a controlled volume of hot off-gases from the powered vessel to the combustion chamber. A fourth duct extends from the combustion chamber to a conventional dust collection means, such as a bag house. A high powered fan communicates with the duct means to induce a draft in the ducts, in the combustion chamber and in the powered and non-powered vessels. The fan also develops a forced draft to the dust collector. A water quenching means is preferably positioned downstream from the combustion chamber and associated with the fourth duct to quench the off-gases from the combustion chamber to prevent the reformation of harmful toxic substances which may otherwise occur if the gas is allowed to remain at high temperatures.

A pair of valves are preferably associated with the first duct means to selectively alternate the directional flow of hot off-gas when cycling from a powered vessel to a non-powered vessel and vice versa. A pair of damper valves are positioned in the second and third ducts to respectively regulate the hot off-gas flow from a powered vessel and the spent off-gas flow from a non-powered vessel to the combustion chamber. The damper valves are regulated by a control means coupled to a temperature probe positioned in the fourth duct located downstream from the outlet of the combustion chamber. When the temperature of the gases exiting the combustion chamber falls below a critical level for burning/cracking the volatile hydrocarbons, for example, about 800° C. or 1200° C., the control means causes the damper valve regulating the flow of hot gases from the powered vessel to the combustion chamber to open further and/or to cause the damper valve regulating the flow of spent off-gases from the non-powered, preheating vessel to close slightly. This modulation effect causes a greater relative volume of higher temperature off-gases (1500° C.–2000° C.) to enter into the combustion chamber to thus raise the temperature in the combustion chamber to a level above the critical temperature to assure complete burning/cracking the objectionable volatiles contained in the off-gases from the non-powered, preheat vessel.

Thus, during the time period that the off-gases from the non-powered preheat vessel pass through the critical range, the damper valves modulate and divide the flow of gas from the melting vessel. A portion of the hot gas from the powered, melting vessel pass through the preheat vessel via the first duct and a portion of the hot gas from the powered vessel pass directly to the combustion chamber via the third duct. Hot gas from the melting vessel is, thus, directed to the combustion chamber and mixes with the cooler gases drawn from the non-powered preheat vessel. The combination of the two gas sources results in a combined temperature above the critical temperature. At the start of the preheat cycle, a small portion of the off-gases are directed to the idle shell for preheating. The remainder of the powered vessel off-gases are used to maintain the final exhaust about the critical temperature. As the scrap absorbs temperature, the off-gas temperature from the preheat vessel rises. The damper valves then increase the flow through the preheat vessel. When the temperature of the spent off-gas from the non-powered vessel rises above the critical temperature, 100% of the hot off-gases from the melting vessel are directed through the non-powered vessel for preheating.

Further, in accordance with the present invention, a plurality of burners are provided in the walls of both of the twin vessels for firing during the preheat cycle in the non-powered vessel. The heat produced by the burners shortens the time the off-gases to the combustion chamber are below the critical range. A higher degree of preheat is obtained with the use of burners before the powered vessel has completed the melting cycle and the role of the vessels are reversed. The addition of burners results in higher costs per day for the oxygen/fuel gas usage, but with the increased ton/day of steel produced, the conversion cost per ton of steel will be reduced.

The present invention also includes a method of shortening the time required to heat the off-gases from the non-powered, preheat vessel to the critical temperature for eliminating noxious and/or toxic emissions. The method involves the step of charging less than the normal tonnage of scrap into the preheat vessel. For example, 60% of the normal scrap charge is introduced into the non-powered, preheat vessel. The reduced charge is heated more rapidly than the normal charge and the critical off-gas temperature is reached much more quickly than in conventional charging practice. The balance of the charge is then made at a later time when the first charge has been melted and the off-gas temperature is well above the critical temperature. In addition, a greater than normal heel of liquid steel may be left in the vessel after tapping to supply additional heat for scrap preheating purposes and thus raise the temperature of the spent off-gas more quickly.

In a further method according to the present invention, the critical temperature of the off-gases leaving the preheat vessel may also be more rapidly reached by firing the aforementioned plurality of oxy-fuel burners in the preheat vessel during the initial preheat operation. As the temperature of the off-gas from the powered vessel increases the BTU input from the oxy-fuel burners in the preheat vessel is reduced and later terminated once the gas from the powered vessel has reached a selected level of, for example, 1500° C.

These as well as other aspects and advantages of the invention will become more apparent when reference is made to the drawings and to the following detailed description.

DETAILED DESCRIPTION OF THE PREFERRED EMBODIMENTS

Figure 1:
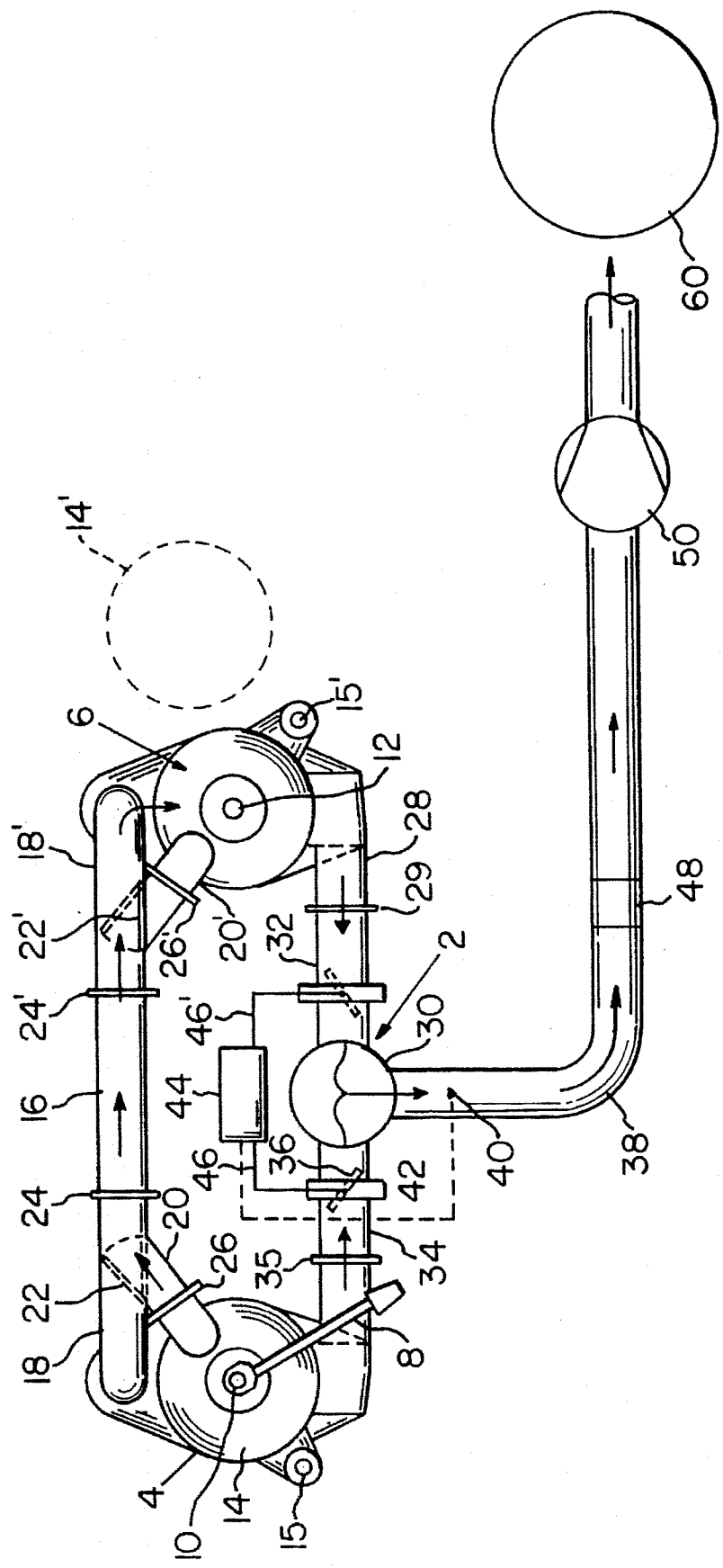
FIG. 1 is a schematic plan view of a twin shell electric arc furnace steelmaking installation showing a presently preferred embodiment of the invention in place thereon.

Referring now to FIGS. 1–4 of the drawings, a presently preferred embodiment of the invention generally designated 2 is shown in conjunction with a known twin shell electric arc furnace installation. The twin shell electric arc furnace installation includes a first shell or furnace vessel 4 and a second shell or furnace vessel 6. A single electric power supply (not shown) is alternately connected by way of a moveable electrical conduit 8 to supply electrical power to a single electrode, or multiple electrodes of one of the vessels 4 or 6. FIG. 1 depicts a D.C. power supply arrangement wherein the conduit 8 is positioned to provide power to a single electrode 10 in the first vessel 4. It is also known to operate such twin shell electric arc furnaces with an A.C. power source, in which case three electrodes are employed in each of the shells or vessels 4 and 6. In certain known installations, the conduit 8 may be pivotally swung or otherwise moved from vessel 4 to couple with an electrode 12 in the second vessel 6 and vice versa. A conventional automatic transfer switch (not shown) may also be utilized to alternately disconnect one vessel from the power supply and connect the other. In either event, one of the vessels 4 or 6 is connected to the power supply and energized or powered while the other vessel is disconnected and completely isolated from the electrical power supply.

As seen in the operation schematically depicted in FIG. 1, the first vessel 4 is in the powered mode while the second vessel 6 is in the non-powered mode. During the powered mode, scrap melting takes place in the vessel 4 while the non-powered vessel 6 is in one of a tap, charge or fettle (repair/maintenance) mode. The non-powered time period is advantageously used to preheat a charge of scrap in the second vessel 6. During this time period, a considerable amount of excess heat is generated in the powered vessel 4 by the virtue of the electric arc melting process being carried out therein. The vessels 4 and 6 each have a removable roof portion 14, 14', respectively, which pivotally swings on respective hinge mountings 15, 15' away from the vessel to an open position as shown by phantom lines in FIG. 1. In the open position, the non-powered vessel 6 is charged with scrap steel from a large bucket carried by a crane (not shown) over the open vessel. A conventional scrap charge may be on the order of 100 to 150 tons, for example. After the scrap charge is deposited in the vessel 6, the roof 14 is swung back into a closed position and the scrap preheating mode commences.

A first duct, generally designated 16, communicates with the powered and non-powered vessels 4 and 6 respectively. The first duct 16 includes a lower duct portion 18 which communicates with a lower sump section of the first vessel 4. A similar lower duct portion 18' communicates with the sump section of the second vessel 6. The first duct 16 also includes an upper duct portion 20 which communicates with an upper portion of the vessel 4 adjacent the furnace roof 14. A similar upper duct portion 20' communicates with the upper portion of the vessel 6.

In a presently preferred embodiment of the invention, hot off-gases are removed from the powered vessel 4 via the upper duct 20. The hot gases pass through the first duct 16 as shown by the arrows in FIG. 1 and enter the second vessel 6 by way of the lower duct portion 18'. This flow pattern is established by a pair of valves 22 and 22' positioned at the junction of the ducts 16, 18 and 20 and at the junction of ducts 16', 18' and 20', respectively.

The first duct 16 also has flanged fittings 24 and 24' thereon which are equipped with known means for selectively allowing a controlled amount of air infiltration into the duct 16. In this manner, atmospheric oxygen is introduced into the hot off-gas stream from the powered vessel to react with any CO which may be present in the off-gas and thereafter convert the unwanted CO to $CO_2$. The upper duct portions 20 and 20' may also contain respective flanged fittings 26 and 26' to allow decoupling of the upper duct portions 20 and 20' carried by the vessel roofs 14 and 14' when the roofs are to be opened by pivotal movement about the hinge mountings 15 and 15' respectively.

In the preheat mode shown in FIG. 1, hot off-gases are removed from the powered vessel 4 initially at lower temperatures on the order of between about 500° C.– 1000° C. as the scrap melts and later increases to about 1500° C.–2000° C. These hot off-gases travel through the first duct 16 to enter the vessel 6, which has been previously charged with scrap. The hot gas travels through the cooler scrap charge giving up its sensible heat thereto. In certain installations, the scrap may be preheated exclusively by a plurality of conventional oxy-fuel burners 25, FIG. 2, positioned around the peripheral sidewall of the vessels 4 and 6. The burners 25 are fired when the particular vessel 4 or 6 is in the preheat, non-powered mode. In such installations where burners 25 are exclusively to preheat the scrap charge, the ducts 16, 18, 18', 20 and 20' would not be required In either event, spent off-gas passes through the preheated scrap charge and gives up its sensible heat. The spent off-gas is much cooler as it exits the non-powered vessel 6 and may, for example, have a temperature on the order of about 800° C. or less. The cooler, spent off-gas leaves the preheating vessel 6 by way of a second duct 28 which communicates with a combustion chamber 30 to permit entry of the spent off-gas therein. A butterfly type damper valve 32 is positioned in the second duct 28 to regulate the flow of spent off-gas therethrough, as will be explained in greater detail below. The second duct 28 also has a break flange 29 therein, whose function will also be discussed below.

The spent off-gas from the preheat vessel 6 may be carrying one or both of noxious and/or toxic hydrocarbons depending upon the type of scrap charged and the temperature of the spent off-gas. If the scrap contains plastic material, such as PVC's mixed therewith, there is a likelihood that dioxins and/or furans may have been generated during the preheating operation. In addition, if the scrap contains oils or greases, such as may be present on steel scrap turnings, for example, the spent off-gas from the preheat vessel may also carry objectionable smelling, noxious hydrocarbons.

The odor causing hydrocarbons are eliminated when the spent off-gas temperature is above about 800° C. while the potentially toxic dioxins and furans are burnt/cracked at temperatures above about 1200° C. Since the spent gas entering the combustion chamber 30 is oftentimes at temperatures below 800° C., particularly during initial preheating and melting, it is necessary to increase the gas temperature in the combustion chamber 30 to eliminate one or both of the noxious or toxic hydrocarbon constituents which may be present. Conventional practice has been to use a plurality of afterburners in a combustion chamber using oxy-fuel burners to burn/crack the objectionable hydrocarbons. The afterburner practice is very energy inefficient, however, and offsets, to a large extent, any energy savings realized in the scrap preheating operation.

In the present invention, the cooler spent gas entering the combustion chamber 30 is heated to the critical temperature required to burn/crack the objectionable hydrocarbons by utilizing a portion of the hot off-gases generated in the powered vessel 4. A third duct 34, also having a break flange fitting 35, communicates with the first vessel 4 and the combustion chamber 30. A butterfly type damper valve 36 is positioned within the third duct 34 to throttle or modulate the flow of hot off-gas from the vessel 4 to the combustion chamber 30.

The break flange fittings 29 and 35 also may allow selective infiltration of atmospheric oxygen into the respective ducts 28 and 34 to allow for combustion of any CO present in the spent off-gases from either of the vessels 4 or 6. The atmospheric oxygen reacts with the CO in the higher temperature combustion chamber 30 or in the hot off-gas stream in duct 34.

Figure 4:
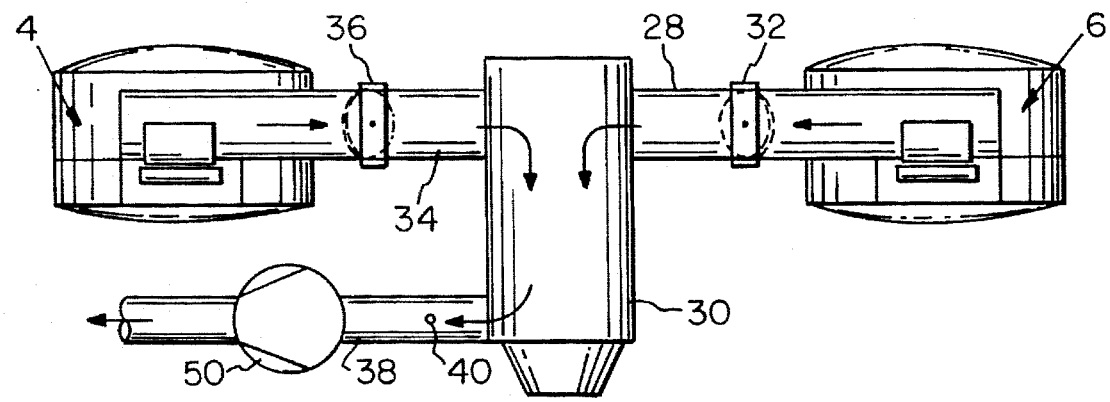
FIG. 4 is a slag door or front side view of the twin electric arc furnace vessels of FIG. 1.

The combustion chamber is preferably cylindrical in shape and elongated in a vertical configuration as shown in FIG. 4. The chamber 30 and the ducts are made from a steel walled construction having water cooling tubes extending therearound to resist the high temperature off-gases. The second and third ducts 28 and 34, respectively, are connected to a top portion of the combustion chamber 30 while an exhaust duct 38 communicates with the combustion chamber at a lower portion thereof. In this manner, heavier particulates will fall by gravity from the off-gas streams to the bottom of the chamber 30.

A temperature probe 40 is positioned in the exhaust duct 38 adjacent to and downstream from the combustion chamber 30 to monitor the temperature of the thermally treated off-gas mixture exiting the combustion chamber 30. The temperature probe 40 is coupled by way of electrical leads 42 to a valve control module 44, as depicted in FIG. 1. The valve control module 44, in turn, is coupled to the damper valves 32 and 36 by way of electrical leads 45 and 46' respectively. Conventional servo-motors (not shown) open and close the damper valves 32 and 36 upon receipt of appropriate signals from the valve control module 44 in response to the temperature readings measured by the probe 40.

When the temperature of the off-gas mixture leaving the combustion chamber 30, as measured by the temperature probe 40, falls below the critical temperature, for example 800° C. or 1200° C., the reading is sent to the control module 44 and the control module 44, in turn, signals the valve 36 to open a selected amount and/or to throttle the valve 32 to permit a greater volume of hot gas from the powered vessel 4 to enter the combustion chamber 30 and, thus, raise the temperature in the combustion chamber 30 above the selected critical temperature.

During the period of time that the off-gases from the preheat vessel pass through the 800° C. to 1200° C. critical range, the damper valves 32 and 36 modulate and divide the flow of gas from the powered, melting vessel 4. A portion of the hot off-gas from the melting vessel 4 passes through the non-powered, preheat vessel 6 and a portion of the gas passes directly to the combustion chamber 30. Thus, the very hot off-gas from the melting vessel is directed to the combustion chamber 30 to mix with the cooler gases drawn from the preheat vessel 6. The commingling of the two gas streams in the combustion chamber 30 results in a combined temperature above the critical temperature which causes complete burning/cracking of the noxious and/or toxic, volatile fractions.

In the case where the scrap preheating is being carried out exclusively by oxy-fuel burners located in the non-powered vessel 6, the firing rate of the burners is modulated by appropriate burner control means coupled to the valve control module 44, damper valve 36 and temperature probe 40.

The hot, treated gas mixture exits the combustion chamber 30 through the exhaust duct 38 and then preferably passes through a quenching zone 48 wherein the gas is rapidly quenched to a lower temperature by a water spray, for example. It is important to rapidly cool the exhaust gas which has been previously treated to burn/crack dioxins and furans. If the exhaust gas is not rapidly cooled below 250° C. the dioxins and furans may reform in the hot exhaust duct 38.

A conventional high horsepower fan 50 communicates with the exhaust duct 38 to induce a draft through the twin vessels 4 and 6 as well as through the first, second and third ducts 16, 28 and 34 and the combustion chamber 30. The fan 50 also causes a forced draft downstream to a conventional dust collection means, such as a bag house 60. Fugitive dust generated by the scrap charging operation, as well as generated by other steelmaking tasks, is collected by a conventional overhead negative draft dust collection system (not shown) and ultimately filtered in the bag house 60. This cooler air stream may be introduced into the duct 38 to further cool the treated off-gas mixture therein. Clean air, free of odor or harmful toxic hydrocarbons is then exhausted from the bag house 60 for release into the atmosphere.

Figure 2:
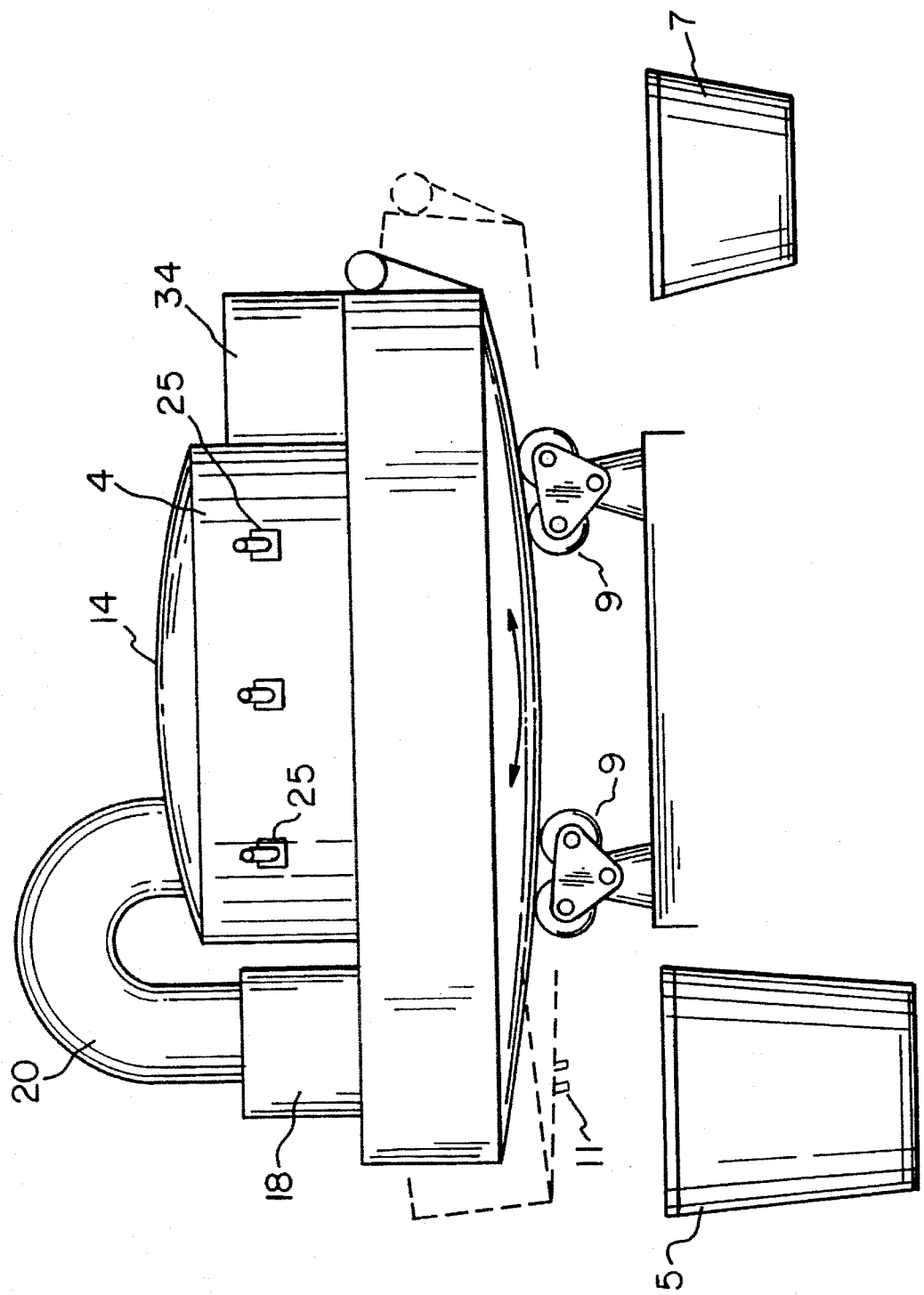
FIG. 2 is an end view of one of the twin electric arc furnace vessels and associated structure of FIG. 1.
Figure 3:
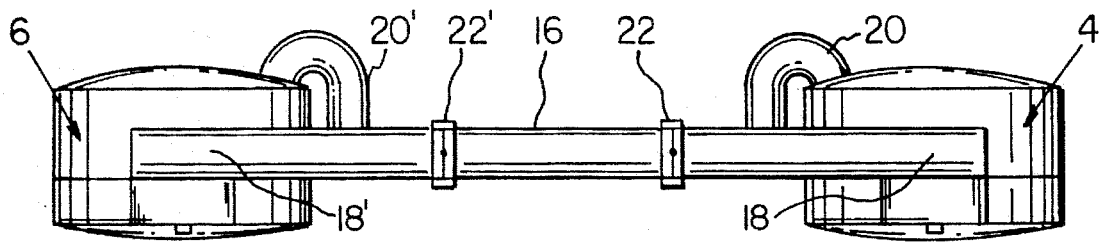
FIG. 3 is a tap or rear side view of the twin electric arc furnace vessels of FIG. 1.

After the melting has been completed and the molten steel in the first vessel 4 is ready to tap or ready for an additional scrap charge, the electrical power is switched to second vessel 6 to melt a preheated scrap charge therein. The molten metal is removed by tapping the previously powered vessel 4 and bottom pouring into a conventional tapping ladle 5. The previously powered vessel is tilted on rollers as shown in FIG. 2 to permit metal flow through a tapping nozzle 11 and thence to the ladle 5. A slag ladle 7 is also provided to remove the slag, all in a conventional manner. A residue or heel of molten steel is preferably left in the tapped vessel to assist in more rapidly preheating the scrap charge which is then made to vessel 4. A heel of liquid steel on the order of 30–40 tons may be left in the tapped vessel for this purpose.

After tapping takes place in vessel 4, the gas flow in the first duct 16 is reversed from the direction shown in FIG. 1 and vessel 4 is then unpowered and placed in the preheat mode. In such case, the valve 22 is moved to a position shown in dashed lines in FIG. 1 so as to open the lower duct portion 18 and close off the upper duct portion 20. Likewise, valve 22' is moved to a position shown in dashed lines so as to open the upper duct portion 20' and close off the lower duct portion 18'. In this manner, the hot off-gases from the now powered vessel 6 exit through the lower duct portion 18' and pass through the first duct 16 to enter the non-powered, preheating vessel 4 through the upper duct portion 20. Gas streams also exit the vessels 6 and 4 through the respective second and third ducts 28 and 34 to enter the combustion chamber 30 in the manner previously described.

The damper valves 32 and 36 are again selectively regulated to modulate the flow of hot off-gases from the now powered vessel 6 to mix with the cooler, spent off-gases from the preheating vessel 4 in the combustion chamber 30, as previously described, so as to achieve temperatures above the selected critical temperature. Thus, it will be readily appreciated that the twin vessels 4 and 6 are alternatively powered in the above-described manner. According to the invention, the very hot off-gases from the powered vessel are used for the dual purposes of preheating the scrap and for eliminating objectionable volatile hydrocarbons in the spent off-gases from the preheat vessel.

It is, of course, desirable to reach the critical temperature in the combustion chamber 30 as quickly as possible to avoid even for a short time period the emission of objectionable hydrocarbons during the startup period of preheat. A current solution is to employ externally fueled afterburners in the combustion chamber 30 to more quickly raise the gas temperature to the critical temperature and thus minimize objectional emissions. This afterburner approach, however, is energy inefficient and decreases or offsets to a large degree the energy efficiency provided by the scrap preheat operation. In accordance with one aspect of the present invention, the temperature of the off-gases from the preheat vessel can be more rapidly heated to the critical temperature with minimal use of externally supplied heat.

Figure 5:
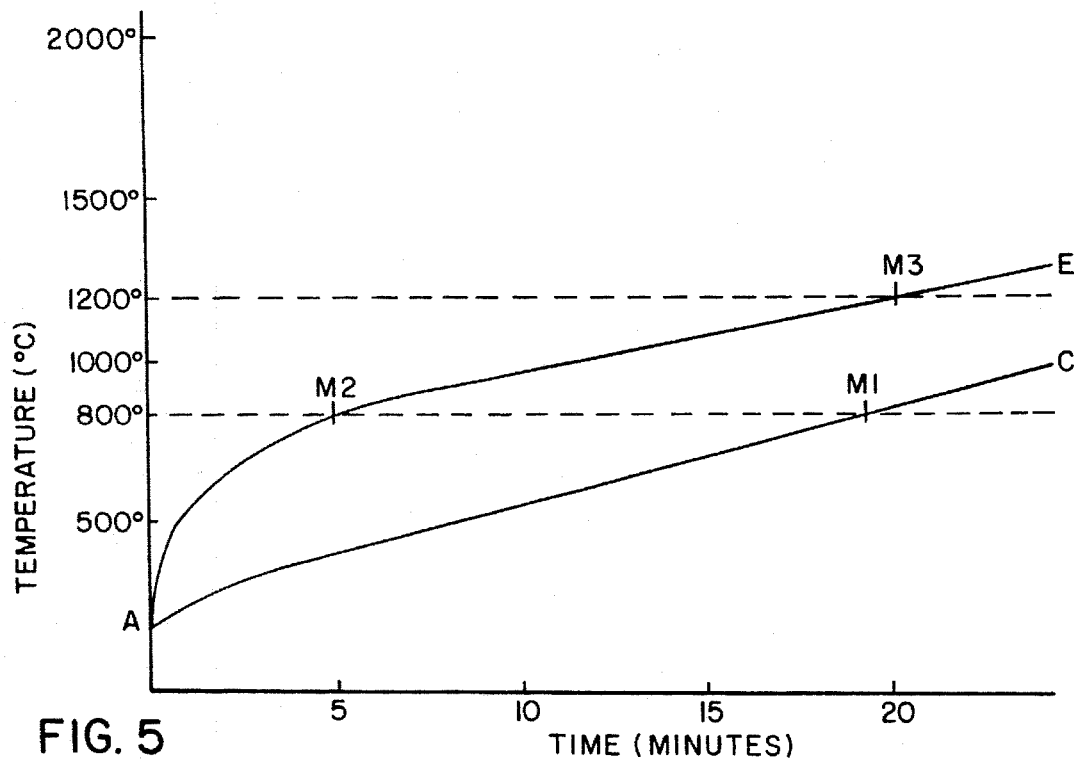
FIG. 5 is a graph showing spent off-gas temperature versus time emitted from a non-powered vessel in a preheat mode under various scrap charging conditions.

FIG. 5 graphically depicts the off-gas temperature from the preheat vessel as a function of time. Curve A–C represents the normal preheat cycle of a scrap charge of about 100 tons with no external heat applied other than the hot preheat gases from the powered vessel. It is seen that the spent off-gases require about 19 minutes to reach the first critical temperature of nearly 800° C. designated point $M_1$, at which the noxious hydrocarbons are burnt/cracked.

In order to decrease the time required to reach the first critical temperature without external heat, it is necessary, according to one preferred aspect of the invention, to reduce the quantity of scrap introduced into the preheat vessel. By way of example, between 60%–70% or approximately two-thirds of the normal charge in a two or multiple bucket operation is utilized. In other words, about a 66 ton first charge would be made and then a second charge of 44 tons would be made. The first reduced charge is made into a previously tapped vessel in which a molten steel heel of about 30 tons remains after tapping. Curve A–E in FIG. 5 depicts the off-gas temperature as a function of time during the preheating of such a reduced first charge of scrap. It is observed that the off-gas temperature reaches the first critical temperature, designated $M_2$, where noxious hydrocarbon emissions are stopped in less than about five minutes without externally applied heat. The time required to reach the second critical temperature of 1200° C. where dioxins and furans are treated without external burners, designated $M_3$, is on the order of about 20 minutes according to curve A–E. This latter period suggests that externally supplied energy either by hot off-gases from the powered vessel or from burners are required to decrease the potential for the emission of the PCDD's and PCDF's in less time. A plurality of oxy-fuel burners, such as burners 25, may be activated in the peripheral sidewall of the non-powered vessel to supply additional heat during initial startup preheating. The burners 25 reduce the time required to reach the critical temperatures for objectionable hydrocarbon treatment when the off-gas from the powered vessel is below 800° C. As the temperature increases in the hot off-gases from the powered vessel, the heat required from the oxy-fuel burner system 25 is reduced. After startup, the oxy-fuel requirements become minimal and/or are no longer needed for maintaining the off-gas temperature from the preheating vessel above the critical temperatures. Once the off-gases from the powered vessel exceed the 1200° C. level, the off-gas streams can be selectively modulated to the combustion chamber 30 to exclusively control the destruction of the objectionable hydrocarbon emissions without the need for the oxy-fuel burners 25.

While several presently preferred embodiments of the invention have been described in detail, it will appreciated by those skilled in the art that various modifications and alternatives to those details could be developed in light of the overall teachings of the disclosure. Accordingly, the particular arrangements are meant to be illustrative only and are not limiting as to the scope of the invention which is to be given the full breadth of the appended claims and any and all equivalents thereof.

What is claimed is:

1. Apparatus for abating volatile hydrocarbon emissions generated during a scrap preheating cycle in a twin vessel electric arc furnace steelmaking operation, comprising:

a first duct means for interconnecting said twin vessels to permit a hot off-gas generated by a powered vessel to flow to a non-powered vessel for preheating of scrap therein;

a combustion chamber;

a second duct means for interconnecting the non-powered vessel and the combustion chamber to permit the flow of a spent off-gas containing volatile hydrocarbons from the non-powered vessel to said combustion chamber;

a third duct means interconnecting the powered vessel and the combustion chamber to permit the flow of hot off-gas from the powered vessel to said combustion chamber; and means for regulating the flow of hot off-gas from the powered vessel to the combustion chamber and the flow of spent off-gas from the non-powered vessel to the combustion chamber, whereby, said hot off-gas and said spent off-gas form a mixture in said combustion chamber to achieve a selected critical temperature to eliminate the volatile hydrocarbons therein.

2. The emissions abating apparatus of claim 1 including a fourth duct means communicating with the combustion chamber to permit a flow of said mixture of off-gases from said combustion chamber.

3. The emissions abating apparatus of claim 2 including quenching means associated with said fourth duct means for cooling said mixture of off-gases to prevent the reformation of objectionable hydrocarbons.

4. The emissions abating apparatus of claim 3 including air pollution control means communicating with said fourth duct means in a downstream locating from said quenching means to remove particulate material from the gases in said fourth duct means.

5. The emissions abating apparatus of claim 1 wherein the means for regulating the flow of hot off-gas and spent off-gas to the combustion chamber comprises a pair of damper valves, respectively positioned in said second and third duct means, a temperature probe means for measuring a temperature of said mixture of off-gases and control means responsive to said temperature probe means for opening and closing said pair of valves in response to a temperature sensed by said temperature probe means to maintain a temperature of said mixture of off-gases substantially at said selected critical temperature.

6. The emissions abating apparatus of claim 5 including a fourth duct means communicating with the combustion chamber to receive said mixture of off-gases from the combustion chamber and wherein said temperature probe means is located in said fourth duct means and adjacent said combustion chamber.

7. The emissions abating apparatus according to claim 1 including means associated with the first and third duct means to permit an infiltration of atmospheric oxygen into said first and third duct means, whereby, CO present in the hot off-gas is reacted to form $CO_2$.

8. The emissions abating apparatus according to claim 1 including means associated with the second duct means to permit an infiltration of atmospheric oxygen into said second duct means, whereby, CO present in the spent off-gas is reacted in the combustion chamber to form $CO_2$.

9. The emissions abating apparatus of claim 1 wherein said twin vessels each include a plurality of burner means for activation when one of said vessels is in a non-powered, scrap preheating mode for supplying an additional quantity of heat to the scrap during said preheating mode.

10. Apparatus for abating volatile hydrocarbon emissions generated during a scrap preheating cycle in a twin vessel electric arc furnace steelmaking operation, comprising:

means for supplying heat to a non-powered vessel for preheating a scrap charge therein;

a combustion chamber;

a first duct means interconnecting the non-powered vessel and the combustion chamber to permit the flow of a spent off-gas from the non-powered vessel to said combustion chamber;

a second duct means interconnecting a powered vessel and the combustion chamber to permit the flow of a hot off-gas from the powered vessel to said combustion chamber; and means for regulating the flow of hot off-gas from the powered vessel to the combustion chamber and for regulating said means for supplying heat to the non-powered vessel to control the temperature of said spent off-gas, whereby, said hot off-gas and said spent off-gas form a mixture in said combustion chamber to achieve a selected critical temperature to eliminate the volatile hydrocarbons therein.

11. The emissions abating apparatus of claim 10 wherein the means for supplying heat to the non-powered vessel for preheating the scrap charge is a plurality of burners.

12. The emissions abating apparatus of claim 11 wherein the means for regulating the flow of hot off-gas from the powered vessel to the combustion chamber and for regulating the heat supplied by said plurality of burners comprises, a temperature probe means for measuring a temperature of said mixture of off-gases;

a damper valve means for controlling the flow of hot off-gases in said second duct means;

control means coupled to said temperature probe and said damper valve means and to said plurality of burners for opening and closing said damper valve means and for regulating the heat supplied by said burners in response to a temperature sensed by said temperature probe to maintain a temperature of said mixture of off-gases substantially at said selected critical temperature.

13. A method of abating volatile hydrocarbon emissions generated during a scrap preheating cycle in a twin vessel electric arc furnace steelmaking operation comprising the steps of:

melting scrap in a powered vessel;

charging a charge of scrap into a non-powered vessel;

preheating the scrap in the non-powered vessel;

providing a combustion chamber;

directing a spent off-gas from said non-powered vessel to the combustion chamber;

diverting a hot off-gas from said powered vessel to the combustion chamber; and mixing said spent off-gas and hot off-gas in said combustion chamber to heat the spent off-gas to a temperature substantially at a selected critical temperature to eliminate the volatile hydrocarbons therein.

14. The method of claim 13 wherein the scrap preheating step comprises directing a hot off-gas stream from said powered vessel to said non-powered vessel for preheating the scrap.

15. The method of claim 14 including the step of infiltrating atmospheric oxygen into said hot off-gas stream for preheating the scrap to react with CO in said hot off-gas stream to form $CO_2$.

16. The method of claim 13 wherein the preheating step comprises providing a plurality of burners in the non-powered vessel to supply heat to the scrap.

17. The method of claim 13 including the steps of infiltrating atmospheric oxygen into said spent off-gas and reacting CO present in said spent off-gas with said atmospheric oxygen in said combustion chamber to form $CO_2$.

18. The method of claim 13 including the steps of:

providing a predetermined amount of liquid steel in the non-powered vessel prior to the scrap charging step to provide a selected amount of heat in said preheating step; and charging a reduced scrap charge having a selected weight less than a normal charge weight, whereby, said scrap charge is preheated more rapidly than said normal charge.

19. The method of claim 18 wherein said normal charge weight is between about 100–150 tons and said reduced scrap charge is about 60%–70% less than said normal charge weight and wherein 30%–40% of the normal charge weight is charged in a second scrap charging step made after the reduced scrap charge has been preheated and melted.

20. The method of claim 13 including the step of providing a plurality of burners in the non-powered vessel to provide additional heat in said preheating step and to increase a temperature of said spent off-gas from said non-powered vessel to a temperature level where noxious hydrocarbons are eliminated from said spent off-gas.

21. The method of claim 20 wherein the temperature level for eliminating noxious hydrocarbons is about 800° C.

22. A method of abating dioxins and furans emissions generated during a scrap preheating cycle in a twin vessel electric arc furnace steelmaking operation comprising the steps of:

melting scrap in a powered vessel;

charging a charge of scrap into a non-powered vessel;

preheating the scrap in the non-powered vessel;

providing a combustion chamber;

directing a spent off-gas from said non-powered vessel to the combustion chamber;

diverting a hot off-gas from said powered vessel to the combustion chamber;

mixing said spent off-gas and hot off-gas in said combustion chamber to heat the spent off-gas to a temperature substantially at about 1200° C.;

removing the spent off-gas and hot off-gas mixture from said combustion chamber; and cooling said gas mixture to a temperature to prevent a reformation of said dioxins and furans.

23. The method of claim 22 wherein the scrap preheating step comprises directing a hot off-gas stream from said powered vessel to said non-powered vessel for preheating the scrap.

24. The method of claim 22 wherein the preheating step comprises providing a plurality of burners in the non-powered vessel to supply heat to the scrap.

25. A method of abating noxious hydrocarbon emissions generated during a scrap preheating cycle in a twin vessel electric arc furnace steelmaking operation comprising the steps of:

melting scrap in a powered vessel;

charging a charge of scrap into a non-powered vessel;

preheating the scrap in the non-powered vessel;

providing a combustion chamber;

directing a spent off-gas containing said noxious hydrocarbons from said non-powered vessel to the combustion chamber;

diverting a hot off-gas from said powered vessel to the combustion chamber; and mixing said spent off-gas and hot off-gas in said combustion chamber to heat the spent off-gas to a temperature substantially at about 800° C.

26. The method of claim 25 wherein the scrap preheating step comprises directing a hot off-gas stream from said powered vessel to said non-powered vessel for preheating the scrap.

27. The method of claim 25 wherein the preheating step comprises providing a plurality of burners in the non-powered vessel to supply heat to the scrap.

* * * * *

UNITED STATES PATENT AND TRADEMARK OFFICE
CERTIFICATE OF CORRECTION

PATENT NO.   : 5,541,952
DATED        : July 30, 1996
INVENTOR(S)  : Ulrich F. H. Genge, Raymond J. Burda, and John W. Brandon It is certified that error appears in the above-indentified patent and that said Letters Patent is hereby corrected as shown below:

Column 1 Line 38 "Raymona" should read --Raymond--.

Column 1 Line 54 "In" should read --in--.

Column 3 Line 8 "not" should read --hot--.

Signed and Sealed this

Fifteenth Day of October, 1996

BRUCE LEHMAN

Attest:

Attesting Officer     Commissioner of Patents and Trademarks